(12) United States Patent
Huang (10) Patent No.: US 8,138,905 B2
(45) Date of Patent: Mar. 20, 2012

(54) CIRCUIT ARRANGEMENT FOR A TIRE PRESSURE WARNING DEVICE AND TIRE PRESSURE DETECTING METHOD IMPLEMENTED USING THE TIRE PRESSURE WARNING DEVICE

(75) Inventor: Teng-Wen Huang, Taipei Hsien (TW)

(73) Assignee: Teng-Wen Huang, Taipei Hsien (TW)

( * ) Notice: Subject to any disclaimer, the term of this patent is extended or adjusted under 35 U.S.C. 154(b) by 525 days.

(21) Appl. No.: 12/485,928

(22) Filed: Jun. 17, 2009

(65) Prior Publication Data

US 2009/0315697 A1    Dec. 24, 2009

(30) Foreign Application Priority Data

Jun. 18, 2008   (TW) .............................. 97122708 A (51) Int. Cl.
*B60C 23/00* (2006.01)
(52) U.S. Cl. ....... 340/447; 340/442; 340/445; 73/146.4; 73/146.5; 73/146.8; 116/34 R
(58) Field of Classification Search ............... 340/447, 340/445; 73/146.4, 146.5
See application file for complete search history.

(56) References Cited

U.S. PATENT DOCUMENTS

| | | | | |
|---|---|---|---|---|
| 4,695,823 | A * | 9/1987 | Vernon | 340/447 |
| 5,987,980 | A * | 11/1999 | Mangafas et al. | 73/146.8 |
| 6,741,169 | B2 * | 5/2004 | Magiawala et al. | 340/438 |

* cited by examiner

*Primary Examiner* — Donnie Crosland
(74) *Attorney, Agent, or Firm* — CKC & Partners Co., Ltd.

(57) ABSTRACT

A tire pressure warning device having a detection circuit is mounted to an inflation valve on every tire of a car to implement tire pressure detection. First, a microprocessing controller in the detection circuit sends a tire location ID assigned to every tire to a signal receiving circuit provided in a dashboard of the car. Then, the microprocessing controller detects a tire pressure value of the corresponding tire and uses the detected tire pressure value as a standard pressure point for the tire. Thereafter, the microprocessing controller keeps detecting the tire pressure value of the tire. When a detected new tire pressure value is higher or lower than the standard pressure point by a preset percentage, a wireless RF is transmitted to the signal receiving circuit for the latter to identify the tire with high or low tire pressure and emit an alarm while displaying the tire pressure value.

13 Claims, 9 Drawing Sheets

CIRCUIT ARRANGEMENT FOR A TIRE PRESSURE WARNING DEVICE AND TIRE PRESSURE DETECTING METHOD IMPLEMENTED USING THE TIRE PRESSURE WARNING DEVICE

RELATED APPLICATIONS

This application claims priority to Taiwan Application Serial Number 97122708, filed Jun. 18, 2008, which is herein incorporated by reference.

FIELD OF THE INVENTION

The present invention relates to a circuit arrangement for a tire pressure warning device and a tire pressure detecting method implemented using the tire pressure warning device; and more particularly, to a tire pressure warning device that can be used with air types of tires having different tire pressure requirements, allowing a driver to timely know the tire pressure state of every tire at any time via a detection circuit on the tire pressure warning device and a signal receiving circuit on the car.

BACKGROUND OF THE INVENTION

A car is safe, comfortable, convenient, and even noble for driving compared to other traffic means. That is why a lot of people prefer to own a car. Meanwhile, with the upgraded purchasing ability, most people can afford a car now. For the consumers who drive a car, the most important thing is to safely arrive at a destination. There are many factors that have great influences on the safe driving, including the driver's energy, attention, and caution during driving, and conditions of different parts of the car. For instance, it is very important whether the tires and the braking system of the car are normal to perform their functions. A tire having an excessively low or insufficient tire pressure tends to have seriously worn tread to cause unstable gravity center of the car. On the other hand, a tire having an excessively high tire pressure tends to cause instantaneous tire blow-out while the car is moving. Both the badly worn tread and the blown-out tire are fatal to a moving car, and would endanger the driver's and the passengers' life or even other cars moving nearby the car. Therefore, the use of tire pressure warning device is no doubt necessary.

Tire pressure warning devices in the early stages can only detect an insufficient tire pressure state. The danger of an excessively high tire pressure is neglected by people in the past. Taiwanese Patent Publication No. 323600 discloses a circuit arrangement for a tire pressure warning device, which can be used to detect not only an excessively low tire pressure, but also an excessively high tire pressure.

The circuit arrangement for a tire pressure warning device according to Taiwanese Patent Publication No. 323600 includes a detecting and transmitting circuit provided in the tire pressure warning device, and a signal receiving circuit provided on a dashboard of a car. The tire pressure warning device is mounted to every tire of the car. Each of the tire pressure warning devices includes a case having a bore corresponding to an inflation valve on the tire, so that the tire pressure warning device can be mounted to the inflation valve to allow air pressure in the tire to enter the case via the bore. The detecting and transmitting circuit is provided on a printed circuit board in the case for detecting and measuring tire pressure of the tire. The tire pressure detecting and transmitting circuit includes a pressure sensing unit, a signal converter, an encoding unit, a radio converting unit, and a first power supply unit. When a measured tire pressure value is too high or too low, a radio signal is sent to the signal receiving circuit for the latter to identify the tire from which the radio signal is transmitted. The signal receiving circuit then emits an alarm to warn the driver, so that the driver can timely know the tire pressure state of every tire of the car at any time.

While the tire pressure warning device disclosed in Taiwanese Patent Publication No. 323600 is able to detect and determine whether the tire pressure is too high or too low, the radio signal representing the high or low tire pressure is obtained by comparing the detected tire pressure value with preset high and low pressure reference values. Therefore, the tire pressure warning device can only be used to detect a tire that has a tire pressure requirement matching the range between the preset high and low pressure reference values. For other tires that require higher or lower tire pressure, the tire pressure warning device is not able to correctly detect the tire pressure. As a result, the tire pressure warning device disclosed in Taiwanese Patent Publication No. 323600 can only be used on some specific tires instead of being widely used on all kinds of tires.

It is therefore tried by the inventor to develop a circuit arrangement for a tire pressure warning device and a tire pressure detecting method implemented using the tire pressure warning device with an attempt of eliminating the drawbacks in the conventional tire pressure warning devices.

SUMMARY OF THE INVENTION

A primary object of the present invention is to provide a circuit arrangement for a tire pressure warning device, so that the tire pressure warning device can be used with tires having different tire pressure requirements.

Another object of the present invention is to provide a tire pressure detecting method implemented using the tire pressure warning device according to the present invention, so that a driver can timely know the tire pressure state of every tire on a car at any time via a detection circuit on the tire pressure warning device and a signal receiving circuit on the car.

To achieve the above and other objects, the tire pressure warning device is mounted to an inflation valve on every tire of a car. Each of the tire pressure warning devices includes a case, in which a detection circuit is provided. Meanwhile, a signal receiving circuit is installed in a dashboard of the car. When using the tire pressure warning device to detect tire pressure, a microprocessing controller in the detection circuit first sends a tire location identifier (ID) to the signal receiving circuit, so that the signal receiving circuit is able to identify the location of every tire of the car. Then, the microprocessing controller detects a tire pressure value of the corresponding tire and uses the detected tire pressure value as a standard pressure point for the tire; the standard pressure point is also sent to the signal receiving circuit and displayed. Thereafter, the microprocessing controller keeps detecting the tire pressure value of the corresponding tire. When a detected new tire pressure value is higher or lower than the standard pressure point by a preset percentage, a wireless RF signal representing the excessively high or low fire pressure is transmitted to the signal receiving circuit. The signal receiving circuit receives the wireless RF signal and identifies the tire from which the signal is transmitted, and emits a tire pressure abnormal alarm while displaying the tire pressure value on a display device, so that the driver can timely know the tire pressure state of every tire at any time.

In a preferred embodiment of the present invention, the microprocessing controller in the detection circuit on the tire pressure warning device is further directly connected to a light emitting element. When receiving a high or low tire pressure signal output by the microprocessing controller, the light emitting element can emit light to indicate the tire pressure of a corresponding tire is in an abnormal state. With these arrangements, the driver can know whether the tire pressure state of every tire is normal or not directly from the light emitting element externally provided on the car.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
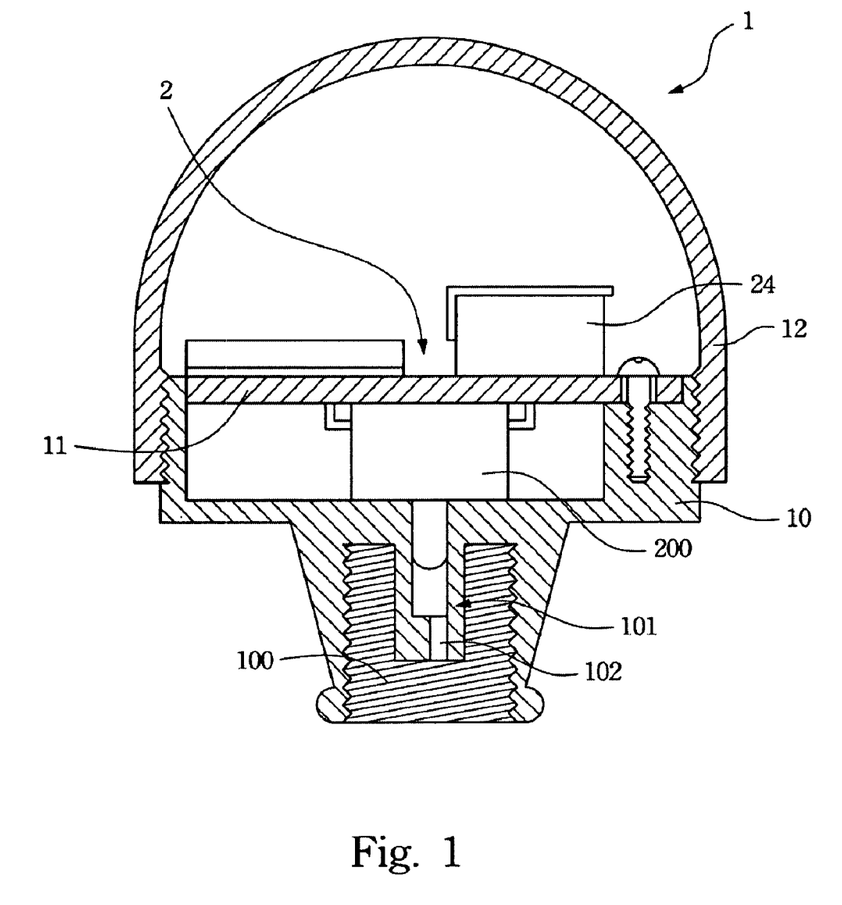
FIG. 1 is a sectional view of a tire pressure warning device according to a first embodiment of the present invention.
Figure 2:
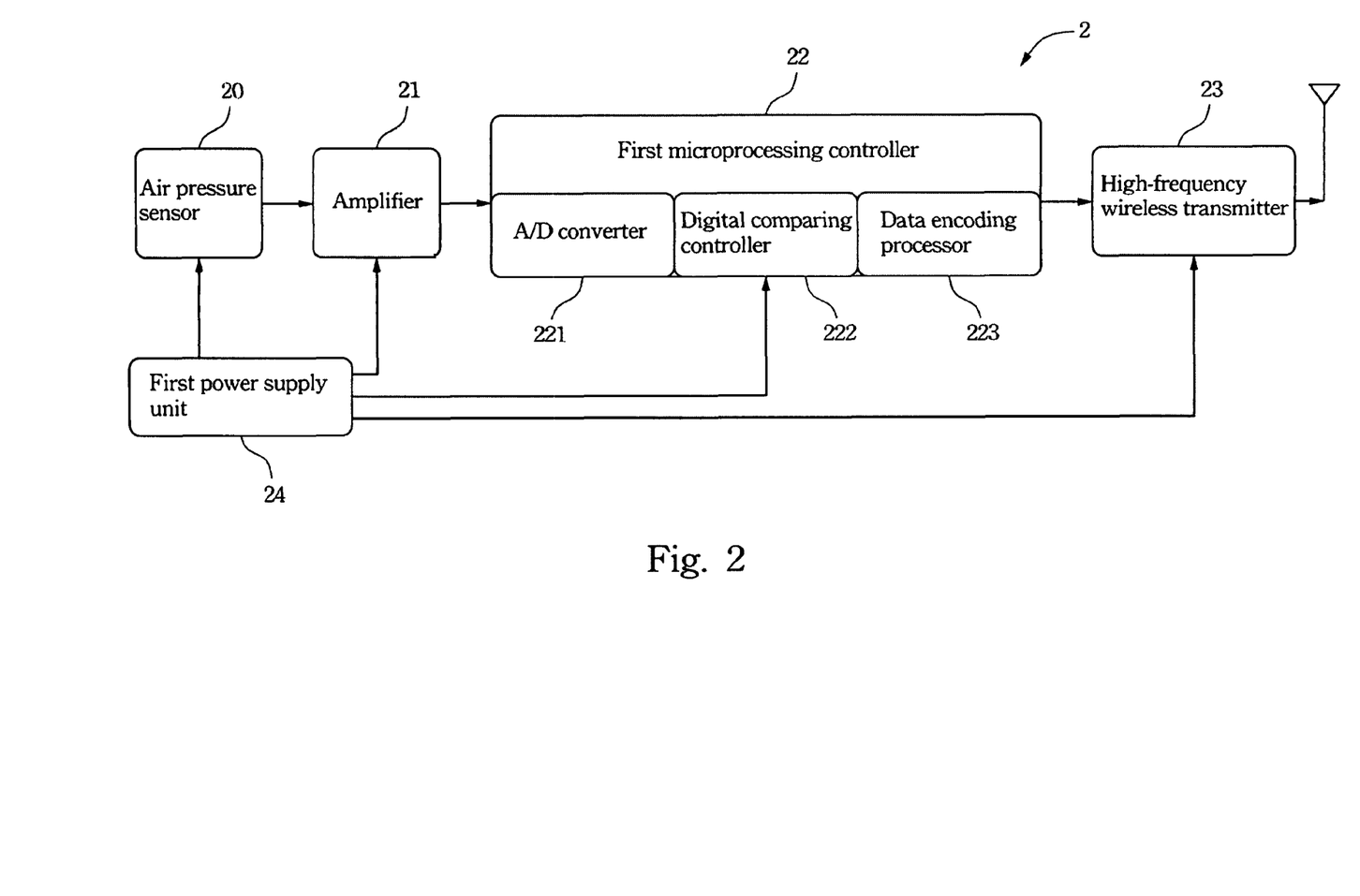
FIG. 2 is a block diagram of a detection circuit included in a circuit arrangement for the tire pressure warning device in the first embodiment of the present invention.
Figure 4:
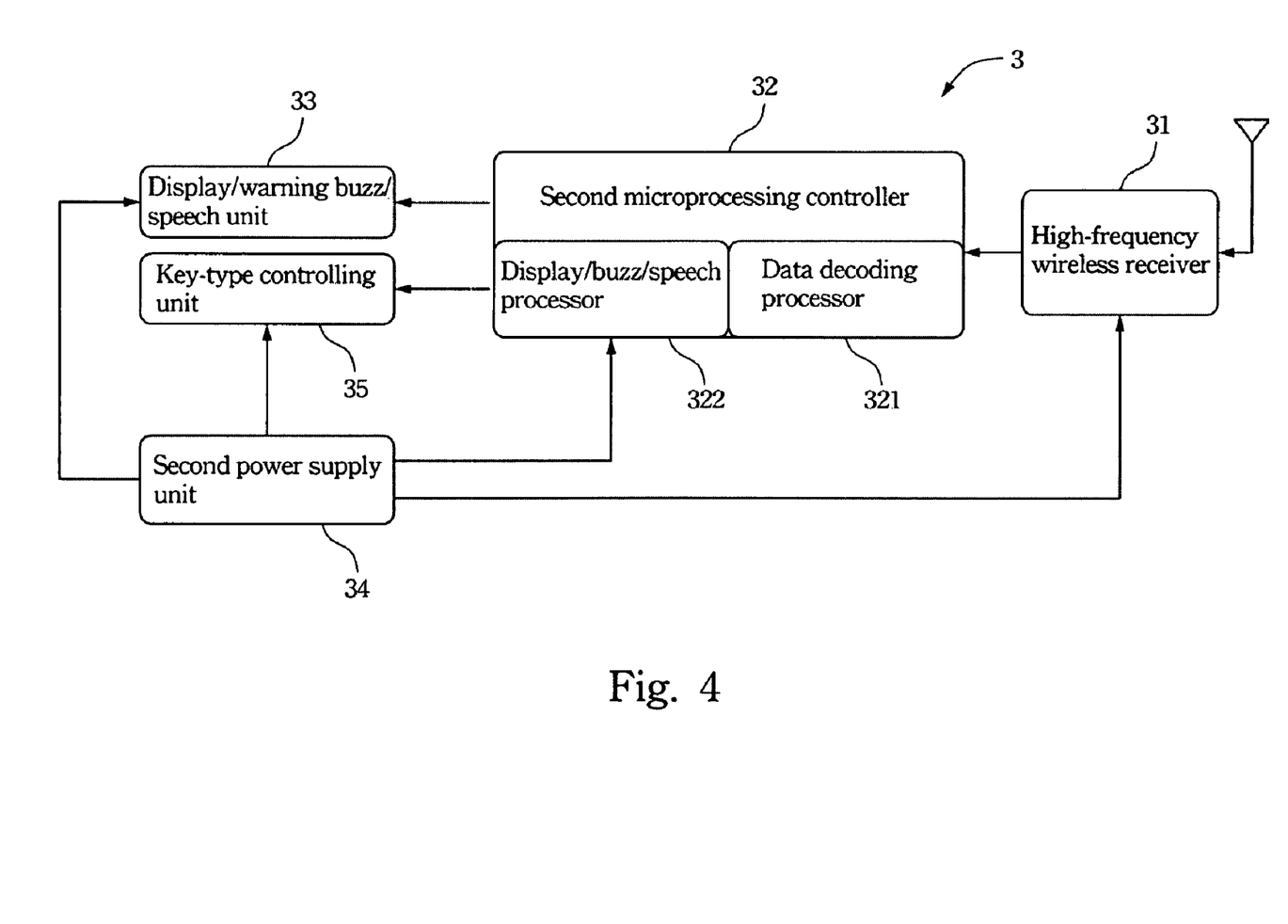
FIG. 4 is a block diagram of a signal receiving circuit included in the circuit arrangement for the tire pressure warning device in the first embodiment of the present invention.

Please refer to FIGS. 1, 2, and 4, in which a circuit arrangement for a tire pressure warning device according to a first embodiment of the present invention is shown. As shown, the circuit arrangement mainly includes a detection circuit 2 provided in a tire pressure warning device 1 and a signal receiving circuit 3 mounted in a dashboard of a car.

The tire pressure warning device 1 is connected to an inflation valve (not shown) on each of the tires of the car, and includes a case 10 and a cover 12 screwed to an open top of the case 10. The case 10 is provided with a bore 100 corresponding to the inflation valve on the tire. In the bore 100, there is formed an axially outward extended hollow push rod 101, which internally defines an air entry 102. When the tire pressure warning device 1 is mounted to the inflation valve on the tire, compressed air in the tire enters the case 10 via the bore 100. The case 10 is internally provided with a printed circuit board 11, on which a pressure sensing and measuring unit 200 and other electronic elements are provided to form the detection circuit 2. When the compressed air in the tire enters the case 10 via the bore 100 and reaches at the pressure sensing and measuring unit 200, the pressure of the compressed air, that is, the tire pressure of the tire can be detected.

The detection circuit 2 includes an air pressure sensor 20, an amplifier 21, a first microprocessing controller 22, a high-frequency wireless transmitter 23, and a first power supply unit 24.

Figure 3:
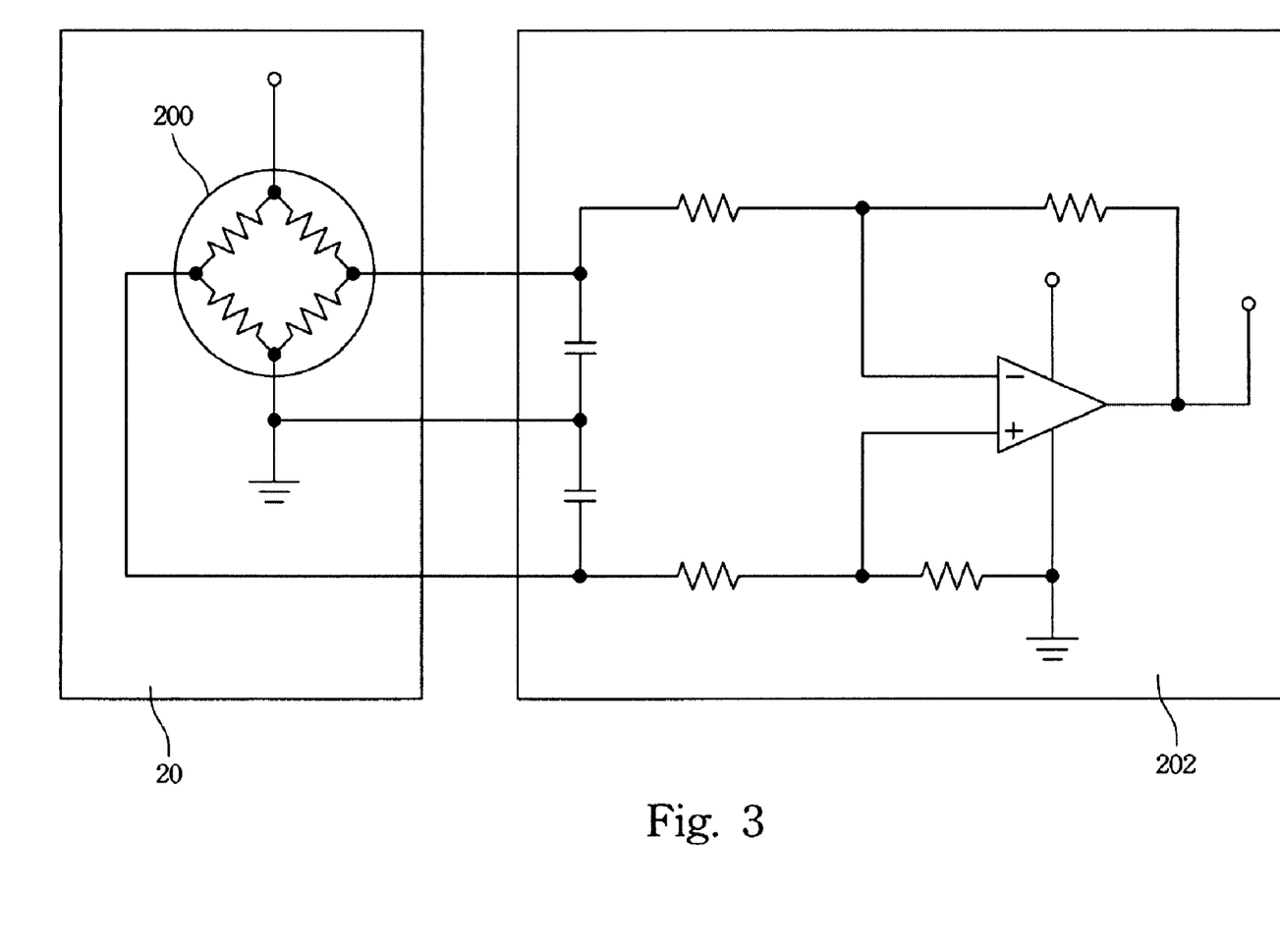
FIG. 3 is a detailed circuit diagram of an air pressure sensor included in the detection circuit of FIG. 2.

FIG. 3 is a detailed circuit diagram of the air pressure sensor 20. As shown, the air pressure sensor 20 includes the above-mentioned pressure sensing and measuring unit 200 and an amplifying circuit 202. The pressure sensing and measuring unit 200 is provided on one side of the printed circuit board 11 facing toward the bore 100 to measure the air pressure of the tire and output a voltage value corresponding to the tire pressure. The output voltage value is an analog signal, which is pretty small and is therefore amplified by the amplifying circuit 202.

The amplifier 21 is connected to the air pressure sensor 20 for amplifying the analog signal output by the air pressure sensor 20.

The first microprocessing controller 22 is connected to the amplifier 21, and includes an analog/digital (A/D) converter 221, a digital comparing controller 222, and a data encoding processor 223. The A/D converter 221 converts the analog signal output by the amplifier 21 into a digital signal, and outputs the digital signal to the digital comparing controller 222. The digital signal first output by the A/D converter 221 represents the tire pressure value of the corresponding tire, and is used by the digital comparing controller 222 as a standard pressure point. When the A/D converter 221 outputs a new digital signal to represent a new tire pressure value of the tire having been detected after the first output digital signal, the digital comparing controller 222 compares the new digital signal with the standard pressure point. In the case the new digital signal is higher than the standard pressure point by a preset percentage, such as +25%, the digital comparing controller 222 outputs a high pressure signal. On the other hand, in the case the new digital signal is lower than the standard pressure point by a preset percentage, such as −15%, the digital comparing controller 222 outputs a low pressure signal. Both of the high pressure signal and the low pressure signal are a digital pulse signal. The data encoding processor 223 encodes the high pressure signal, the low pressure signal, and a tire location identifier (ID) assigned to every tire, and outputs the encoded signals.

The high pressure signal, the low pressure signal, or the tire location ID output by the first microprocessing controller 22 is converted by the high-frequency wireless transmitter 23 into a wireless radio frequency (RF) signal and outputs the same.

The first power supply unit 24 can be a rechargeable battery or a lithium battery, and is electrically connected to the printed circuit board 11. The first power supply unit 24 supplies electric power needed by the air pressure sensor 20, the amplifier 21, the first microprocessing controller 22, and the high-frequency wireless transmitter 23 to operate.

The signal receiving circuit 3 is most preferably mounted in the dashboard of the car, so that a driver is able to timely know the tire pressure state of every tire at any time. The signal receiving circuit 3 includes a high-frequency wireless receiver 31, a second microprocessing controller 32, a display/warning buzz/speech unit 33, and a second power supply unit 34. A key-type controlling unit 35 can be further included.

The high-frequency receiver 31 receives the wireless RF signal output by the high-frequency wireless transmitter 23 of the detection circuit 2, and outputs the received wireless RF signal.

The second microprocessing controller 32 includes a data decoding processor 321 and a display/buzz/speech processor 322. The data decoding processor 321 decodes the wireless RF signal output by the high-frequency wireless receiver 31, so as to identify the high pressure signal, the low pressure signal, or the tire location ID, and outputs the decoded signal to the display/buzz/speech processor 322.

The display/warning buzz/speech unit 33 receives the high pressure signal, the low pressure signal, or the tire location ID output by the display/buzz/speech processor 322, and displays the received high pressure signal, the low pressure signal, or the tire location ID on a display device, such as a liquid crystal display (LCD) screen, a light-emitting-diode (LED) digital display, or a second light-emitting element, so that a driver is able to clearly know which one or more of the tires are too high or too low in tire pressure. The display/warning buzz/speech unit 33 also displays the actual tire pressure value, and can emit a speech or a buzz alarm via a speaker at the same time to inform the driver of the abnormal state of the tire pressure.

The second power supply unit 34 can be a direct current (DC) power supply of 12V to 24V on the car, a rechargeable battery, or a disposable battery for supplying electric power needed by the high-frequency wireless receiver 31, the second microprocessing controller 32, the display/warning buzz/speech unit 33, and the key-type controlling unit 35 to operate.

The key-type controlling unit 35 is connected to the second microprocessing controller 32, and can be a keyboard for inputting data.

The present invention also provides a tire pressure detecting method implemented using the above-described tire pressure warning device 1 and the circuit arrangement therefor. To implement the tire pressure detecting method of the present invention, first mount one tire pressure warning device 1 to the inflation valve on every tire of a car, so that the first microprocessing controller 22 in the detection circuit 2 provided on the tire pressure warning device 1 first sends a tire location ID assigned to every tire to the signal receiving circuit 3 for the latter to identify the location of every tire.

Then, the first microprocessing controller 22 detects the tire pressure value of the corresponding tire and uses it as a standard pressure point for the tire, and sends the standard pressure point to the signal receiving circuit 3 for displaying.

Thereafter, when a tire pressure value detected by the first microprocessing controller later is higher or lower than the standard pressure point by a preset percentage, such as higher than the standard pressure point by +25% or lower than the standard pressure point by −15%, a wireless RF signal representing an excessively high or an excessively low tire pressure value is transmitted to the signal receiving circuit 3. The signal receiving circuit 3 receives the wireless RF signal and identifies the tire from where the wireless RF signal is transmitted, and then emits a tire pressure abnormal alarm while displaying the current tire pressure value.

In the tire pressure detecting method of the present invention, when the first microprocessing controller 22 detects the tire pressure value of the corresponding tire, and the detected tire pressure value is larger than one (1) psi and constantly maintained at this level longer than a preset time period, such as 5 seconds, the tire pressure value is memorized as the standard pressure point.

In the tire pressure detecting method of the present invention, when the detected tire pressure value is lower than 1 psi, the tire is repeated detected for the tire pressure value thereof.

In the tire pressure detecting method of the present invention, when the car is not ignited, the first microprocessing controller 22 sets the detection circuit 2 into a sleep state, so as to save the power of the first power supply unit 24.

In the tire pressure detecting method of the present invention, when the first microprocessing controller 22 detects that the first power supply unit 24 is power low, a wireless RF signal representing weak power is transmitted from the detection circuit 2 to the signal receiving circuit 3. The signal receiving circuit 3 receives the weak power signal and displays a warning to the driver that the first power supply unit 24 is power low.

Figure 5:
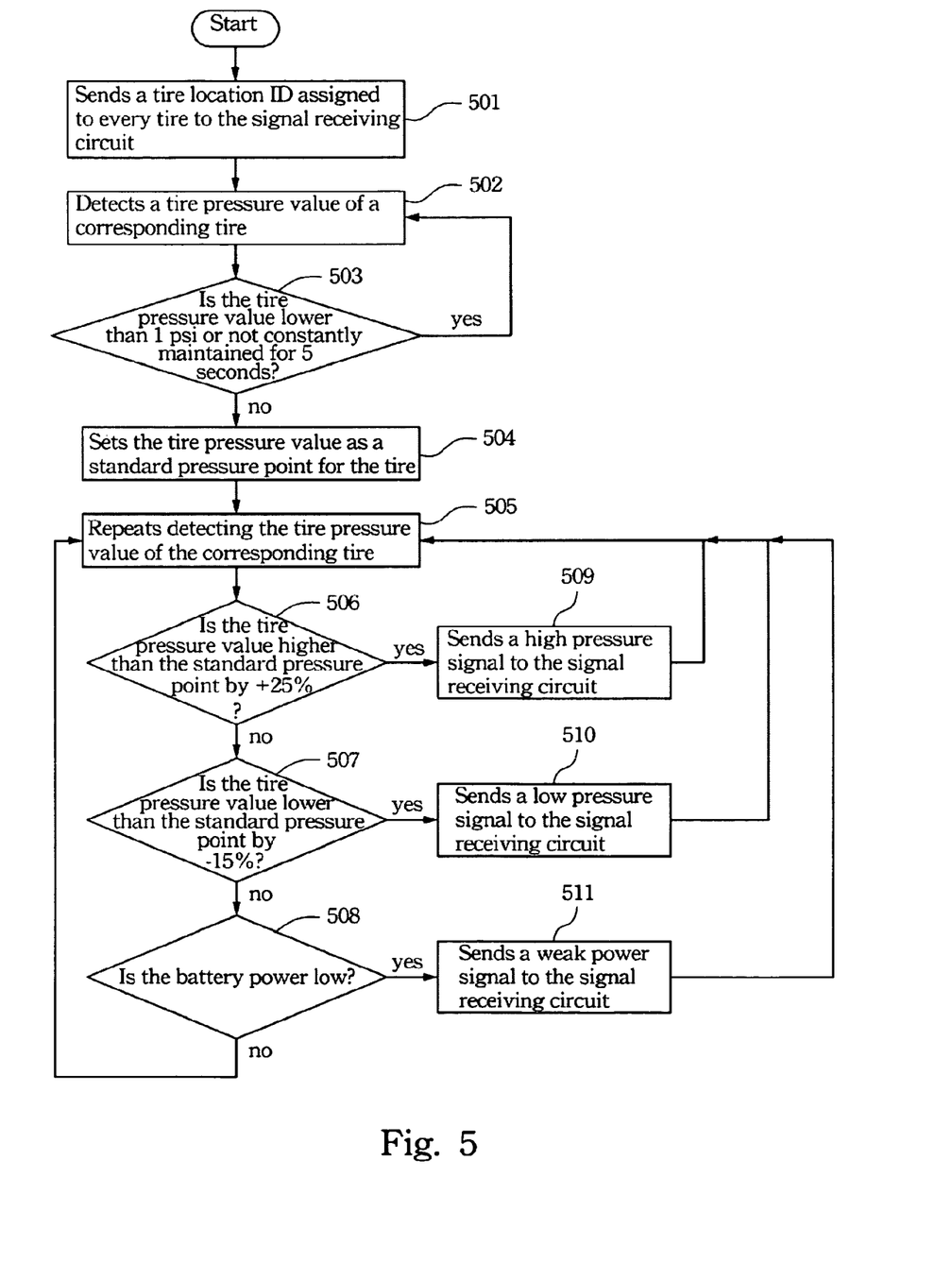
FIG. 5 is a flowchart showing the steps included in a tire pressure detecting method using the tire pressure warning device of the present invention.

Please refer to FIG. 5 that is a flowchart showing the steps included in the tire pressure detecting method according to the present invention. When the first power supply units 24 are switched on and all the tire pressure warning devices 1 are enabled, each of the first microprocessing controllers 22 operates in the following steps;

Step 501: First, sends the tire location ID of the corresponding tire to the signal receiving circuit 3, so that the signal receiving circuit 3 can identify the location of every tire of the car.

Step 502: Detects and measures the tire pressure value of the corresponding tire.

Step 503: Determines whether the detected tire pressure value is lower than 1 psi or could not be constantly maintained for 5 seconds. If yes, the tire pressure value is repeatedly detected; or, if no, goes to the Step 504.

Step 504: Sets the detected tire pressure value as a standard pressure point.

Step 505: Keeps detecting and measuring the tire pressure value of the corresponding tire.

Step 506: Determines whether the tire pressure value detected later is higher than the standard pressure point by +25%. If yes, goes to the Step 509; or, if no, goes to the Step 507.

Step 507: Determines whether the tire pressure value detected later is lower than the standard pressure point by −15%. If yes, goes to the Step 510; or, if no, goes to the Step 508.

Step 508: Determines whether the first power supply unit 24 is power low. If yes, goes to the Step 511; or, if no, repeats the Step 505.

Step 509: Transmits a high pressure signal to the signal receiving circuit 3, and then repeats the Step 505.

Step 510: Transmits a low pressure signal to the signal receiving circuit 3, and then repeats the Step 505. And, Step 511: Transmits a weak power signal to the signal receiving circuit 3 to indicate the first power supply unit 24 is power low, and then repeats the Step 505.

Figure 6:
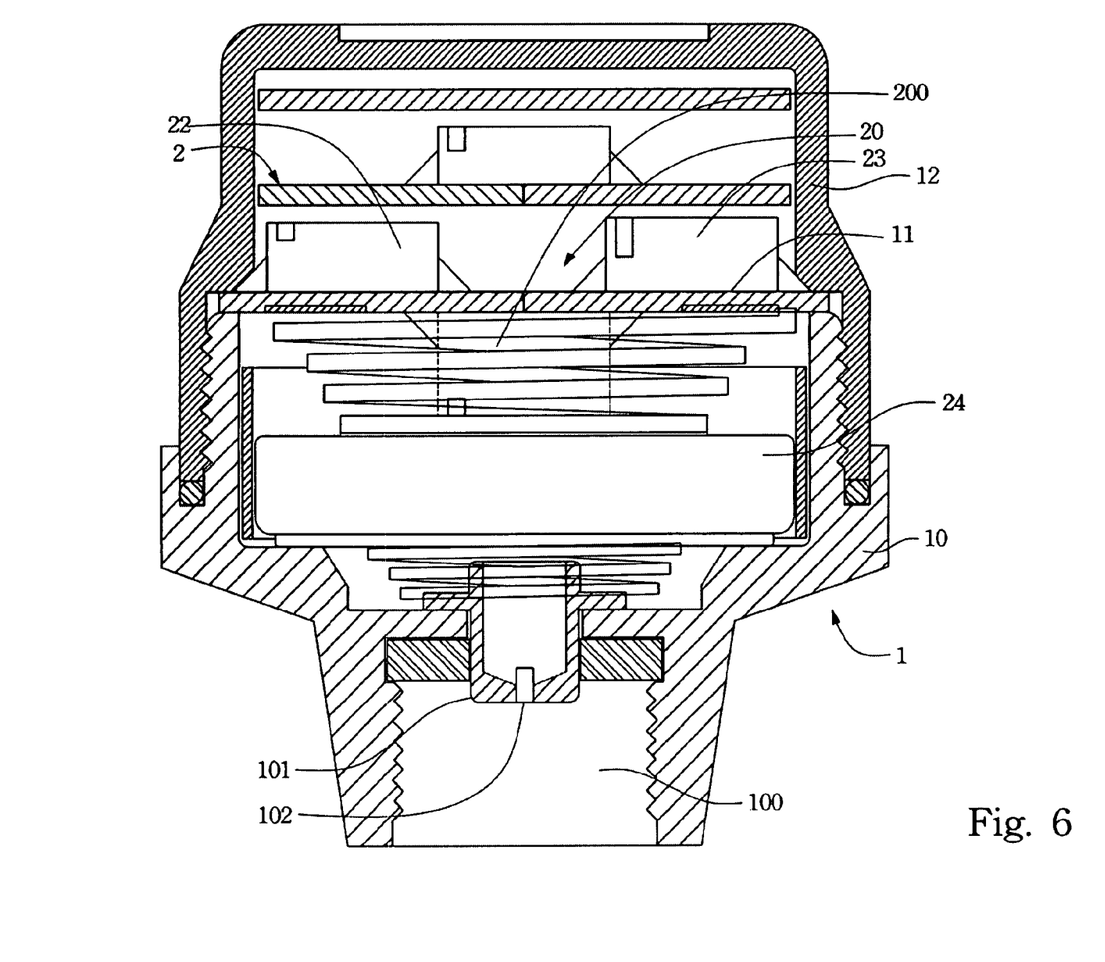
FIG. 6 is a sectional view of a tire pressure warning device according to a second embodiment of the present invention.

FIG. 6 is a sectional view of a tire pressure warning device according to a second embodiment of the present invention, which has another different configuration but is provided with a circuit arrangement and may be used to implement a tire pressure detecting method the same as those described in the first embodiment of the present invention. That is, the circuit arrangement and the tire pressure detecting method according to the present invention may be implemented on a tire pressure warning device of any configuration or type.

Figure 7:
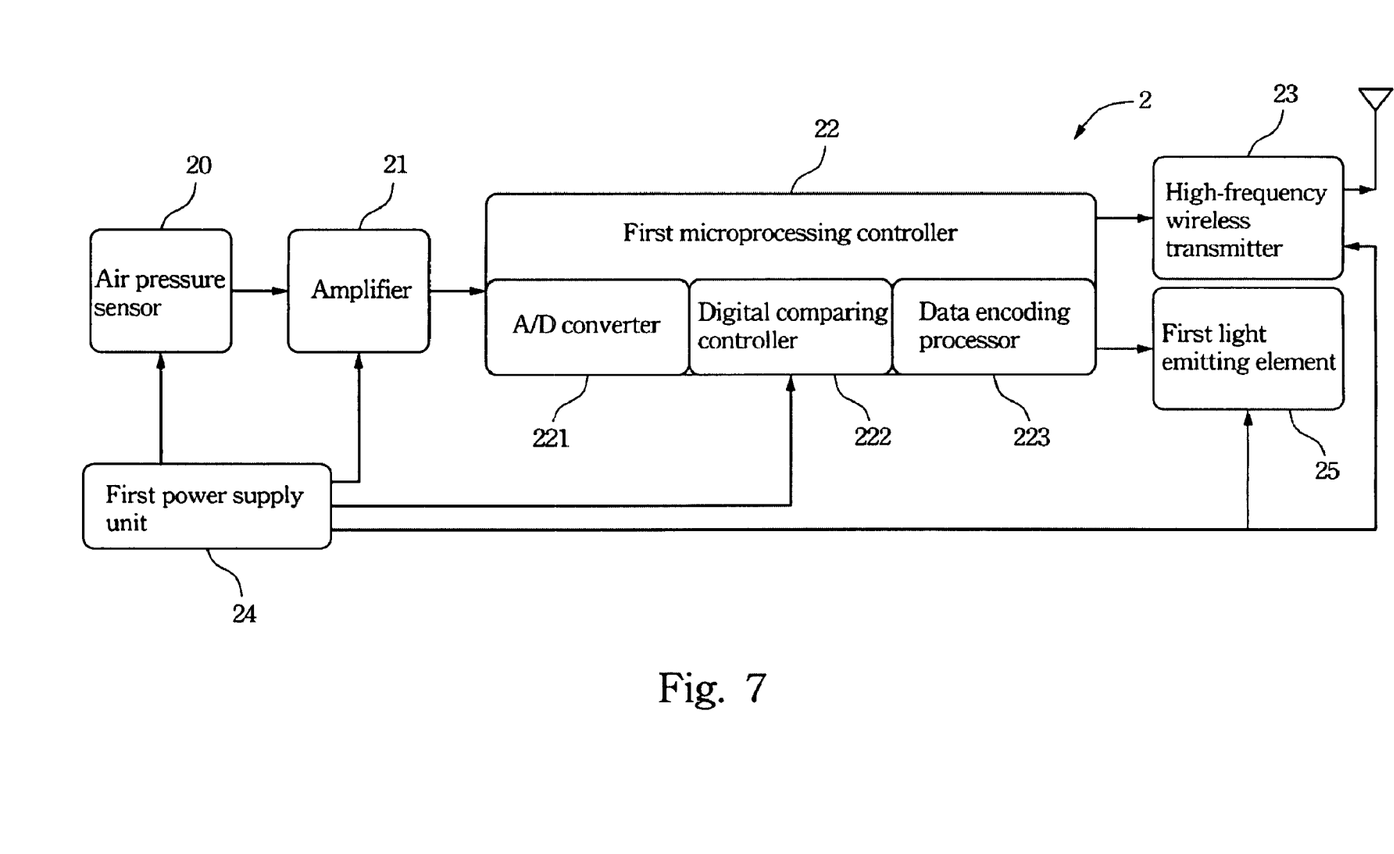
FIG. 7 is a block diagram of a detection circuit included in the circuit arrangement for a tire pressure warning device according to a third embodiment of the present invention.

FIG. 7 is a block diagram of a detection circuit included in the circuit arrangement for a tire pressure warning device according to a third embodiment of the present invention. As shown, the circuit arrangement in the third embodiment is generally structurally similar to the first embodiment, except for a first light emitting element 25 connected to the first microprocessing controller 22 of the detection circuit 2. The light emitting element 25 is connected to the high-frequency wireless transmitter 23 in parallel, and is powered by the first power supply unit 24. When receiving the high pressure signal or the low pressure signal output by the first microprocessing controller 22, the first light emitting element 25 will emit light, indicating the tire has an abnormal tire pressure. Therefore, the driver can know the tire pressure state of every tire of the car not only from the signal receiving circuit 3 but also from the lighting of the first light emitting element 25, which are internally and externally provided on the car, respectively.

Figure 8:
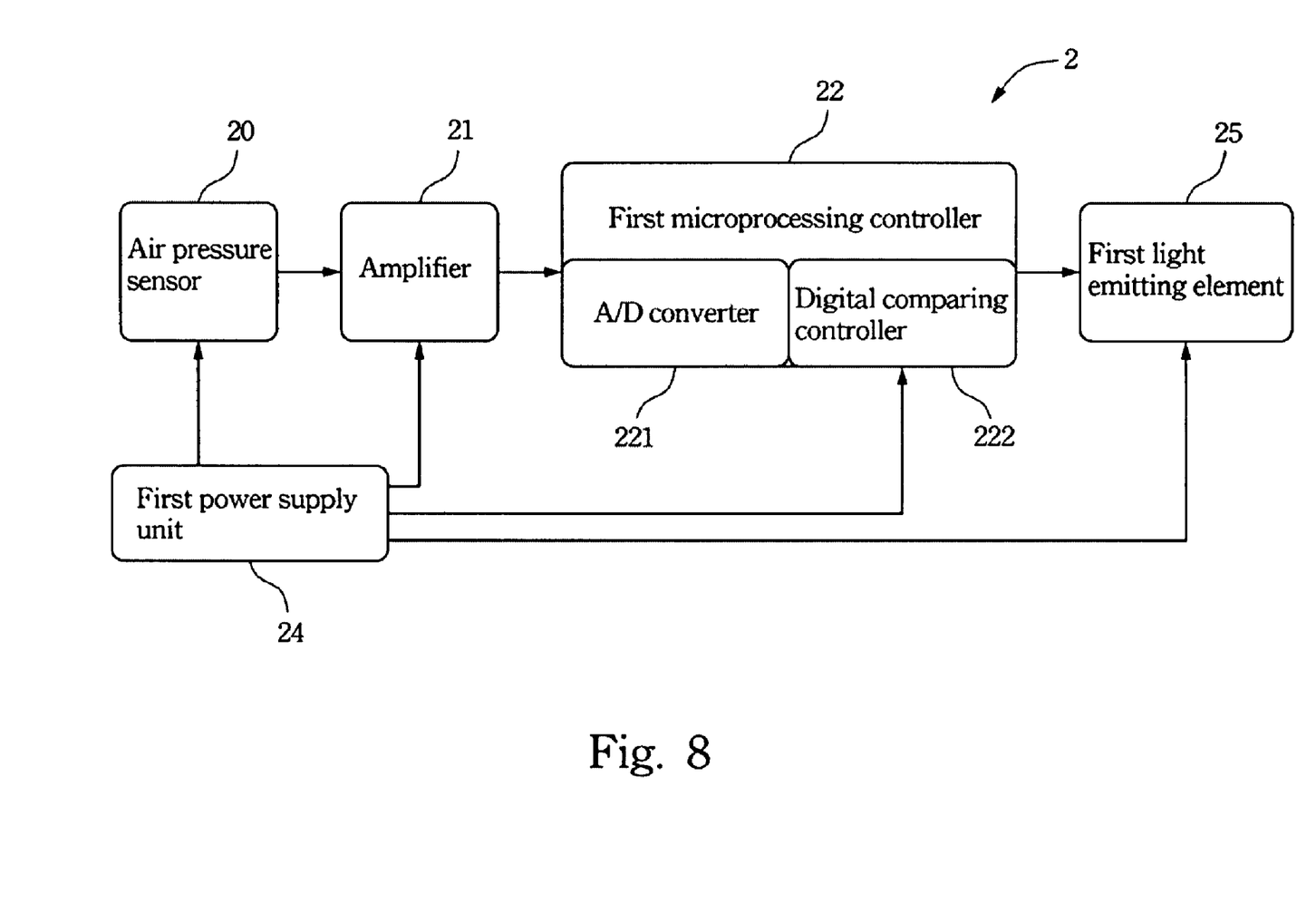
FIG. 8 is a block diagram of a detection circuit included in the circuit arrangement for a tire pressure warning device according to a fourth embodiment of the present invention.
Figure 9:
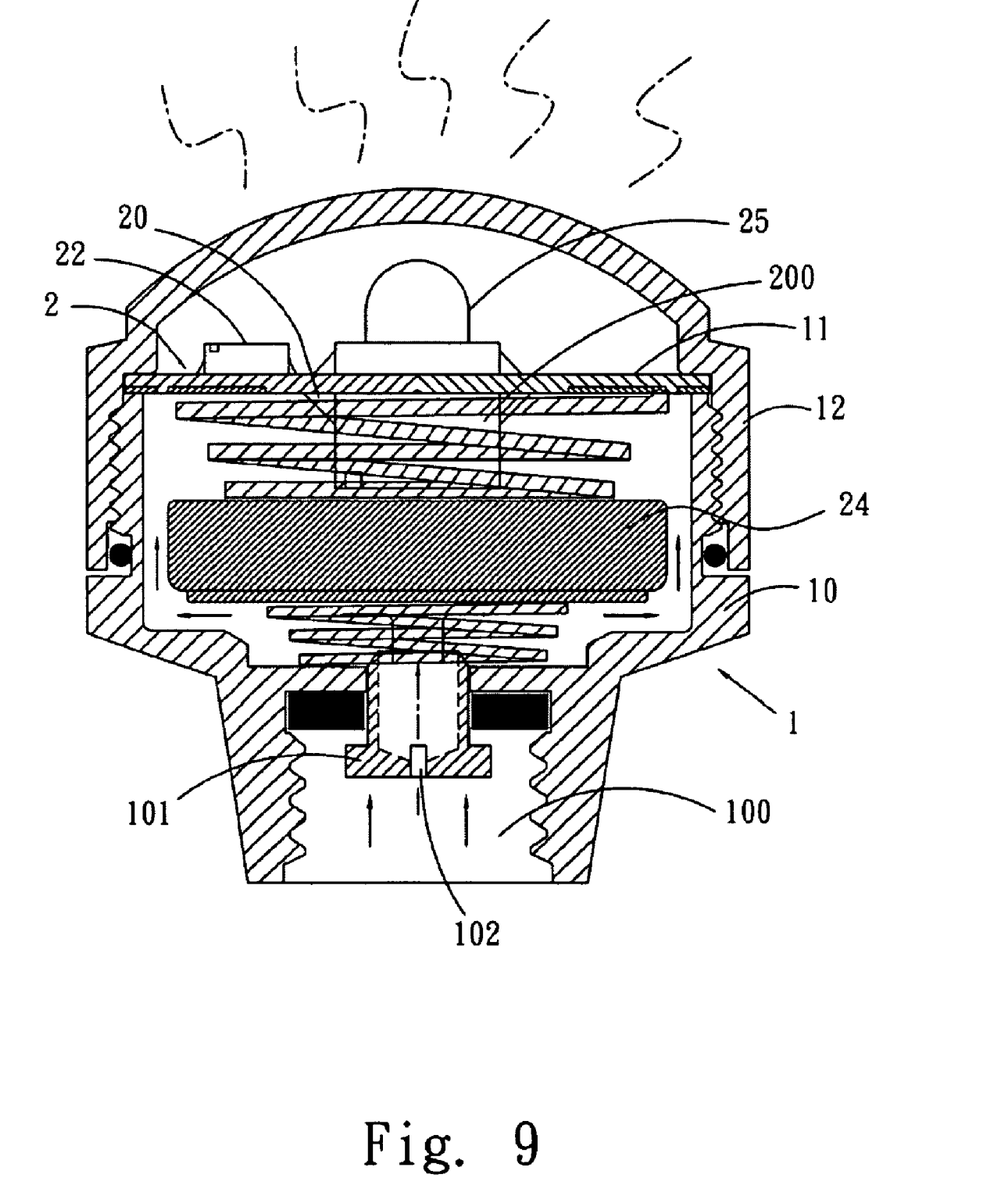
FIG. 9 is a sectional view of the tire pressure warning device according to the fourth embodiment of the present invention.

FIG. 8 is a block diagram of a detection circuit included in the circuit arrangement for a tire pressure warning device according to a fourth embodiment of the present invention, and FIG. 9 is a sectional view of the tire pressure warning device of the fourth embodiment. As shown, the detection circuit 2 in the fourth embodiment is generally structurally similar to the first embodiment, except that the first microprocessing controller 22 is directly connected to a first light emitting element 25, which is powered by the first power supply unit 24, and that the data encoding processor 223 and the high-frequency wireless transmitter 23 in the first embodiment are omitted from the fourth embodiment. When receiving the high pressure signal or the low pressure signal output by the first microprocessing controller 22, the first light emitting element 25 will emit light, indicating the tire has an abnormal tire pressure. Therefore, the driver can know the tire pressure state of every tire of the car directly from the lighting condition of the first light emitting element 25 externally provided on the car without the help from the signal receiving circuit 3. In the circuit arrangement of the fourth embodiment, since the signal output by the first microprocessing controller 22 is directly sent to the first light emitting element 25 instead of being transmitted from the high-frequency wireless transmitter 23 in the form of a wireless RF signal to the signal receiving circuit 3, the signal output by the first microprocessing controller 22 does not require any encoding. Thus, the data encoding processor 223 is omitted from the first microprocessing controller 22.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A circuit arrangement for a tire pressure warning device, the tire pressure warning device being mounted to an inflation valve on every tire of a car, and including a case internally provided with a printed circuit board; the circuit arrangement comprising a detection circuit provided on the printed circuit board and consisting of a pressure sensing and measuring unit and other electronic elements, and a signal receiving circuit internally provided in the car;

the detection circuit including:
an air pressure sensor consisting of the pressure sensing and measuring unit and an amplifying circuit; the pressure sensing and measuring unit being provided on one side of the printed circuit board facing toward the inflation valve of the tire for measuring tire pressure of the tire and outputting a voltage value, which is an analog signal corresponding the measured tire pressure and is amplified by the amplifying circuit;
an amplifier being connected to the air pressure sensor for amplifying the analog signal output by the air pressure sensor;
a first microprocessing controller being connected to the amplifier, and including an A/D converter, a digital comparing controller, and a data encoding processor; the A/D converter converting the analog signal output by the amplifier into a digital signal and outputting the digital signal to the digital comparing controller; the digital signal first output by the A/D converter corresponding to a tire pressure value of the tire, and being used by the digital comparing controller as a standard pressure point; the digital comparing controller also comparing the standard pressure point with a new digital signal, which corresponds to a new tire pressure of the tire and is output by the A/D converter after the first output digital signal; the digital comparing controller outputting a high pressure signal when the new digital signal is higher than the standard pressure point by a preset percentage, or outputting a low pressure signal when the new digital signal is lower than the standard pressure point by a preset percentage; the data encoding processor encoding the high pressure signal, the low pressure signal, and a tire location ID assigned to every tire, and output ting the encoded signals;
a high-frequency wireless transmitter being connected to the first microprocessing controller for converting the high pressure signal, the low pressure signal, or the tire location ID output by the first microprocessing controller into a wireless RF signal, and outputting the wireless RF signal; and
a first power supply unit being electrically connected to the printed circuit board for supplying electric power needed by the air pressure sensor, the amplifier, the first microprocessing controller, and the high-frequency wireless transmitter to operate; and
the signal receiving circuit receiving the wireless RF signal output by the detection circuit, and displaying the received wireless RF signal.

2. The circuit arrangement for a tire pressure warning device as claimed in claim 1, wherein the signal receiving circuit is mounted in a dashboard on the car, and includes:
a high-frequency wireless receiver for receiving the wireless RF signal output by the high-frequency wireless transmitter of the detection circuit, and outputting the received wireless RF signal;
a second microprocessing controller consisting of a data decoding processor and a display/buzz/speech processor; the data decoding processor decoding the wireless RF signal output by the high-frequency wireless receiver to identify the high pressure signal, the low press are signal, or the tire location ID, and outputting the decoded signal to the display/buzz/speech processor;
a display/warning buzz/speech unit for receiving the high pressure signal, the low pressure signal, or the tire location ID output by the display/buzz/speech processor, displaying the received high pressure signal, low pressure signal, or tire location ID on a display device, and displaying an actual tire pressure value of the corresponding tire; and
a second power supply unit for supplying electric power needed by the high-frequency wireless receiver, the second microprocessing controller, and the display/warning buzz/speech unit to operate.

3. The circuit arrangement for a tire pressure warning device as claimed in claim 2, wherein the signal receiving circuit further includes a key-type controlling unit being connected to the second microprocessing controller and powered by the second power supply unit to operate.

4. The circuit arrangement for a tire pressure warning device as claimed in claim 2, wherein the display/warning buzz/speech unit is selected from the group consisting of an LCD screen, an LED digital display, and a second light emitting element.

5. The circuit arrangement for a tire pressure warning device as claimed in claim 1, wherein the first microprocessing controller is connected to a first light emitting element; the first light emitting element being connected to the high-frequency wireless transmitter in parallel and powered by the first power supply unit to operate.

6. A circuit arrangement for a tire pressure warning device, the tire pressure warning device being mounted to an inflation valve on every tire of a car, and including a case internally provided with a printed circuit board, the circuit arrangement comprising a detection circuit provided on the printed circuit board and consisting of a pressure sensing and measuring unit and other electronic elements, and a signal receiving circuit internally provided in the car;

the detection circuit including:
an air pressure sensor consisting of the pressure sensing and measuring unit and an amplifying circuit; the pressure sensing and measuring unit being provided on one side of the printed circuit board facing toward the inflation valve of the tire for measuring tire pressure of the tire and outputting a voltage value, which is an analog signal corresponding the measured tire pressure and is amplified by the amplifying circuit;
an amplifier being connected to the air pressure sensor for amplifying the analog signal output by the air pressure sensor;
a first microprocessing controller being connected to the amplifier, and including an A/D converter and a digital comparing controller; the A/D converter converting the analog signal output by the amplifier into a digital signal and outputting the digital signal to the digital comparing controller; the digital signal first output by the A/D converter corresponding to a tire pressure value of the tire, and being used by the digital comparing controller as a standard pressure point for the tire; the digital comparing controller also comparing the standard pressure point with a new digital signal, which corresponds to a new tire pressure of the tire and is output by the A/D converter after the first output digital signal; the digital comparing controller outputting a high pressure signal when the new digital signal is higher than the standard pressure point by a preset percentage, or outputting a low pressure signal when the new digital signal is lower than the standard pressure point by a preset percentage;
a first light emitting element being connected to the first microprocessing controller for indicating the high pressure signal or the low pressure signal output by the first microprocessing controller; and
a first power supply unit being electrically connected to the printed circuit board for supplying electric power needed by the air pressure sensor, the amplifier, the first microprocessing controller, and the first light emitting element to operate.

7. The circuit arrangement for a tire pressure warning device as claimed in claim 6, wherein the first power supply unit is selected from the group consisting of a rechargeable battery and a lithium battery.

8. A tire pressure detecting method implemented using a tire pressure warning device, comprising the following steps:
mounting the tire pressure warning device to an inflation valve on every tire of a car; the tire pressure warning device including a detection circuit, a first microprocessing controller of which sending a tire location ID assigned to every tire to a signal receiving circuit provided in a dashboard of the car, so that the signal receiving circuit is able to identify the tire location of every tire; the detection circuit also including a power supply unit for supplying electric power needed by the detection circuit to operate;
the first microprocessing controller further detecting a tire pressure value of the corresponding tire, and using the detected tire pressure value as a standard pressure point for the tire; and
the first microprocessing controller keeping detecting the tire pressure value of the corresponding tire, and a wireless RF signal representing an excessively high or an excessively low tire pressure value being transmitted to the signal receiving circuit when a new tire pressure value detected by the first microprocessing controller later is higher or lower than the standard pressure point by a preset percentage; and the signal receiving circuit receiving the wireless RF signal to identify the tire from where the wireless RF signal is transmitted, and then emitting a tire pressure abnormal alarm.

9. The tire pressure detecting method as claimed in claim 8, wherein when the first microprocessing controller detects the tire pressure value of the corresponding tire, and the detected tire pressure value is larger than one (1) psi and constantly maintained at this level longer than a preset time period, the tire pressure value is memorized as the standard pressure point.

10. The tire pressure detecting method as claimed in claim 8, wherein the signal receiving circuit also displays the tire pressure value of every tire detected by the first microprocessing controller.

11. The tire pressure detecting method as claimed in claim 8, wherein the step of keeping detecting tire pressure value is repeated when a detected tire pressure value for the tire is lower than 1 psi.

12. The tire pressure detecting method as claimed in claim 8, wherein when the car is not ignited, the first microprocessing controller sets the detection circuit into a sleep state to save electric power.

13. The tire pressure detecting method as claimed in claim 8, wherein when the first microprocessing controller detects that the first power supply unit is power low, a wireless RF signal representing weak power is transmitted from the detection circuit to the signal receiving circuit; and the signal receiving circuit receives the weak power signal and displays a warning to indicate the first power supply unit is power low.

* * * * *